US011815020B2

(12) United States Patent
Naccache et al.

(10) Patent No.: US 11,815,020 B2
(45) Date of Patent: Nov. 14, 2023

(54) TANGENTIAL ON-BOARD INJECTOR (TOBI) ASSEMBLY

(71) Applicant: PRATT & WHITNEY CANADA CORP., Longueuil (CA)

(72) Inventors: Gabriel Naccache, Longueuil (CA);
Christopher Gover, Longueuil (CA);
Alexander Smith, Montréal (CA);
Alain Martel, St-Paul d'Abbotsford (CA); Matthieu Boudreau, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/813,745

(22) Filed: Jul. 20, 2022

(65) Prior Publication Data
US 2022/0356842 A1 Nov. 10, 2022

Related U.S. Application Data

(62) Division of application No. 16/656,750, filed on Oct. 18, 2019, now Pat. No. 11,421,597.

(51) Int. Cl.
| F01D 5/08 | (2006.01) |
| F02C 7/12 | (2006.01) |
| F02C 7/22 | (2006.01) |

(52) U.S. Cl.
CPC .............. *F02C 7/12* (2013.01); *F01D 5/081* (2013.01); *F01D 5/082* (2013.01); *F02C 7/22* (2013.01);
(Continued)

(58) Field of Classification Search
CPC .......... F01D 5/081; F01D 5/082; F01D 5/084; F01D 9/065; F01D 25/12
See application file for complete search history.

(56) References Cited

U.S. PATENT DOCUMENTS

| 4,541,774 A | * | 9/1985 | Rieck ...................... F01D 5/085 |
| | | | 415/115 |
| 4,882,902 A | | 11/1989 | Reigel et al. |

(Continued)

FOREIGN PATENT DOCUMENTS

| CA | 2343888 C | 10/1999 |
| CA | 2316576 C | 8/2000 |

(Continued)

*Primary Examiner* — Thuyhang N Nguyen
(74) *Attorney, Agent, or Firm* — NORTON ROSE FULBRIGHT CANADA (57) ABSTRACT

A tangential on-board injector (TOBI), comprising: a body defining an annular passageway to receive cooling air, the TOBI defining a plurality of discharge nozzles; a rotating component mounted for rotation relative to the body about an axis of rotation; a seal extending between the body and the rotating component; a plurality of vanes circumferentially distributed about the axis of rotation and located downstream of the plurality of discharge nozzles relative to a flow of the cooling air circulating toward the seal from the plurality of discharge nozzles and upstream of the seal; and flow passages defined between the plurality of vanes, a flow passage of the flow passages extending along a passage axis, the passage axis having a tangential component at an outlet of the flow passage that is different than a tangential component of an exit flow axis of a nozzle of the plurality of discharge nozzles.

20 Claims, 5 Drawing Sheets

(52) U.S. Cl.
CPC ...... *F05D 2220/32* (2013.01); *F05D 2240/35* (2013.01); *F05D 2240/55* (2013.01)

(56) References Cited

U.S. PATENT DOCUMENTS

| | | | |
|---|---|---|---|
| 5,984,630 | A | 11/1999 | Di Salle et al. |
| 6,379,117 | B1 | 4/2002 | Ichiryu |
| 6,468,032 | B2 | 10/2002 | Patel |
| 6,540,477 | B2 * | 4/2003 | Glynn ................ F01D 5/18 |
| | | | 415/115 |
| 6,773,225 | B2 | 8/2004 | Yuri et al. |
| 6,837,676 | B2 | 1/2005 | Yuri et al. |
| 6,923,005 | B2 * | 8/2005 | Casoni ............ F01D 11/02 |
| | | | 60/785 |
| 7,017,349 | B2 | 3/2006 | Laurello et al. |
| 7,287,384 | B2 | 10/2007 | Fish et al. |
| 7,341,429 | B2 | 3/2008 | Montgomery et al. |
| 7,591,631 | B2 | 9/2009 | Hendricks et al. |
| 7,670,103 | B2 | 3/2010 | Turner et al. |
| 7,682,131 | B2 | 3/2010 | Legare et al. |
| 7,785,067 | B2 | 8/2010 | Lee et al. |
| 8,277,169 | B2 | 10/2012 | Riahi et al. |
| 8,381,533 | B2 | 2/2013 | Smoke et al. |
| 8,517,666 | B2 | 8/2013 | Alvanos et al. |
| 8,529,195 | B2 * | 9/2013 | Widener ............ F02C 7/18 |
| | | | 415/176 |
| 8,899,924 | B2 | 12/2014 | Alvanos |
| 9,810,079 | B2 | 11/2017 | Manning et al. |
| 9,915,204 | B2 | 3/2018 | Suciu et al. |
| 9,920,652 | B2 | 3/2018 | Suciu et al. |
| 9,945,248 | B2 | 4/2018 | McCaffrey et al. |
| 10,001,061 | B2 | 6/2018 | Suciu |
| 10,107,126 | B2 | 10/2018 | Ackermann et al. |
| 10,233,842 | B2 | 3/2019 | Clum et al. |
| 2005/0201859 | A1 | 9/2005 | Coulon et al. |
| 2009/0110561 | A1 | 4/2009 | Ramerth et al. |
| 2009/0232637 | A1 * | 9/2009 | Propheter-Hinckley ................ F01D 9/065 |
| | | | 415/116 |
| 2016/0153291 | A1 | 6/2016 | Snyder et al. |
| 2016/0312615 | A1 | 10/2016 | Lyons |
| 2018/0298770 | A1 | 10/2018 | Devore et al. |
| 2018/0298774 | A1 | 10/2018 | Carlson et al. |
| 2018/0340423 | A1 * | 11/2018 | Stuart ................ F01D 5/087 |

FOREIGN PATENT DOCUMENTS

| | | |
|---|---|---|
| CA | 2430739 C | 12/2001 |
| CA | 2430106 C | 5/2003 |
| CA | 2498057 C | 9/2003 |
| CA | 2567938 C | 11/2006 |
| CA | 2603312 C | 9/2007 |
| CN | 1322226 C | 5/2003 |
| CN | 100381677 C | 9/2003 |
| EP | 1163429 B1 | 10/1999 |
| EP | 1079067 B1 | 8/2000 |
| EP | 1343950 B1 | 12/2001 |
| EP | 1367225 B1 | 5/2003 |
| EP | 1537296 B1 | 9/2003 |
| EP | 1445421 | 8/2004 |
| EP | 1741874 B1 | 6/2006 |
| EP | 1820936 B1 | 1/2007 |
| EP | 3090163 B1 | 12/2014 |
| JP | 04111827 B2 | 12/2001 |
| JP | 04146257 B2 | 3/2003 |
| JP | 04088557 B2 | 5/2003 |
| JP | 05156221 B2 | 11/2006 |
| JP | 2013185453 | 9/2013 |
| KR | 779286 B1 | 6/2003 |
| RU | 2287072 C2 | 12/2001 |
| WO | 03040524 | 5/2003 |

* cited by examiner

TANGENTIAL ON-BOARD INJECTOR (TOBI) ASSEMBLY

CROSS-REFERENCE TO RELATED APPLICATIONS

The present application is a divisional of U.S. patent application Ser. No. 16/656,750 filed Oct. 18, 2019, the entire content of which is incorporated herein by reference.

TECHNICAL FIELD

The application relates generally to gas turbine engine component cooling and, more particularly, to a tangential on-board injector (TOBI) assembly.

BACKGROUND

Blades, vanes, and other components of gas turbine engines which may become susceptible to damage by a hot gas stream, such as turbine components for example, can be cooled by air compressed upstream within the engine and flowed to the turbine components. A tangential on-board injector (TOBI) is used for this purpose, where an inlet of the TOBI receives compressed air, typically produced by the compressor, and discharges a stream of cooling air tangentially to the rotating turbine assembly. Improvements of such TOBIs are however sought.

SUMMARY

In one aspect, there is provided a tangential on-board injector (TOBI) of a gas turbine engine, comprising: a body defining an annular passageway configured to receive cooling air, the TOBI defining a plurality of discharge nozzles; a rotating component configured to be mounted for rotation relative to the body about an axis of rotation; a seal extending between the body and the rotating component; and flow passages circumferentially distributed about the axis of rotation and in fluid communication with the nozzles and the seal, the flow passages located upstream of the seal relative to a flow of the cooling air circulating toward the seal from the plurality of discharge nozzles, each of the flow passages extending along a respective passage axis, the passage axis of at least one of the flow passages having a tangential component at an outlet of the at least one of the flow passages that is different than a tangential component of an exit flow axis of at least one of the plurality of discharge nozzles.

In another aspect, there is provided a tangential on-board injector (TOBI) assembly of a gas turbine engine, comprising: a TOBI having a body defining an annular passageway configured to receive cooling air, the TOBI defining a plurality of discharge nozzles; a rotating component configured to be mounted for rotation relative to the body about an axis of rotation; a seal extending between the body and the rotating component; and at least one deswirling element upstream of the seal relative to a flow of the cooling air circulating toward the seal, the at least one deswirling element having a face oriented at least partially toward the plurality of discharge nozzles and oriented to be intersected by the flow of the cooling air exiting the plurality of discharge nozzles.

In yet another aspect, there is provided a method of deswirling cooling air from a tangential on-board injector (TOBI) of a gas turbine engine, comprising: receiving a flow of the cooling air from nozzles of the TOBI, a direction of the flow from the TOBI having a tangential component relative to a central axis of the gas turbine engine; directing a portion of the flow from the nozzles toward a seal located between a casing assembly and a rotor assembly; and changing a magnitude of a tangential component of the portion of the flow by circulating the portion of the flow through flow passages located between the seal and the nozzles.

In still another aspect, there is provided a tangential on-board injector (TOBI) of a gas turbine engine, comprising: a body defining an annular passageway configured to receive cooling air, the TOBI defining a plurality of discharge nozzles; a rotating component configured to be mounted for rotation relative to the body about an axis of rotation; a seal extending between the body and the rotating component; a plurality of vanes circumferentially distributed about the axis of rotation and located downstream of the plurality of discharge nozzles relative to a flow of the cooling air circulating toward the seal from the plurality of discharge nozzles and upstream of the seal; and flow passages defined between the plurality of vanes, a flow passage of the flow passages extending along a passage axis, the passage axis having a tangential component at an outlet of the flow passage that is different than a tangential component of an exit flow axis of a nozzle of the plurality of discharge nozzles.

In still yet another aspect, there is provided a method of deswirling cooling air from a tangential on-board injector (TOBI) of a gas turbine engine, comprising: receiving a flow of the cooling air from nozzles of the TOBI, a direction of the flow from the TOBI having a tangential component relative to a central axis of the gas turbine engine; directing a portion of the flow from the nozzles toward a seal located between a casing assembly and a rotor assembly; and changing a magnitude of a tangential component of the portion of the flow by circulating the portion of the flow through flow passages defined between a plurality of vanes circumferentially distributed about the central axis and located downstream of the nozzles relative to the flow of the cooling air circulating toward the seal from the nozzles and upstream of the seal.

In still further another aspect, there is provided a tangential on-board injector (TOBI) assembly of a gas turbine engine, comprising: a TOBI having a body defining an annular passageway configured to receive cooling air, the TOBI defining a plurality of discharge nozzles; a rotating component configured to be mounted for rotation relative to the body about an axis of rotation; a seal extending between the body and the rotating component; at least one deswirling element upstream of the seal relative to a flow of the cooling air circulating toward the seal, the at least one deswirling element having a face oriented at least partially toward the plurality of discharge nozzles and oriented to be intersected by the flow of the cooling air exiting the plurality of discharge nozzles, the at least one deswirling element including a plurality of vanes circumferentially distributed about the axis of rotation and located downstream of the plurality of discharge nozzles relative to a flow of the cooling air circulating toward the seal from the plurality of discharge nozzles and upstream of the seal.

BRIEF DESCRIPTION OF THE DRAWINGS

Reference is now made to the accompanying figures in which.

DETAILED DESCRIPTION

Figure 1:
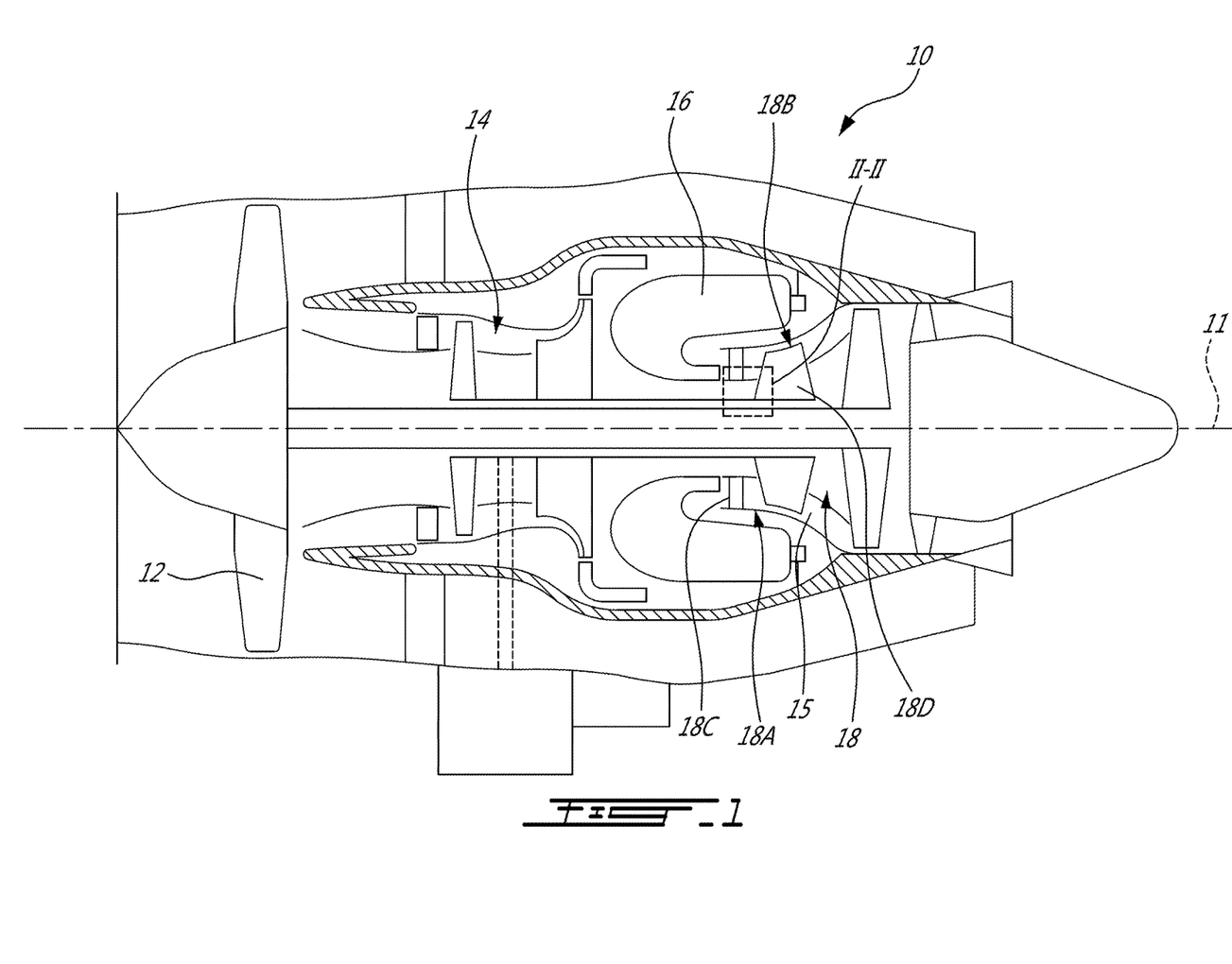
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Components of the gas turbine engine 10 rotate about a longitudinal center axis 11.

The turbine section 18 includes a stator assembly 18A and a rotor assembly 18B. A flow path 15 for the hot combustion gases is provided downstream of the combustor 16, and extends axially between alternating rows of stator vanes 18C of the stator assembly 18A, and rotor blades 18D of the rotor assembly 18B.

Figure 2:
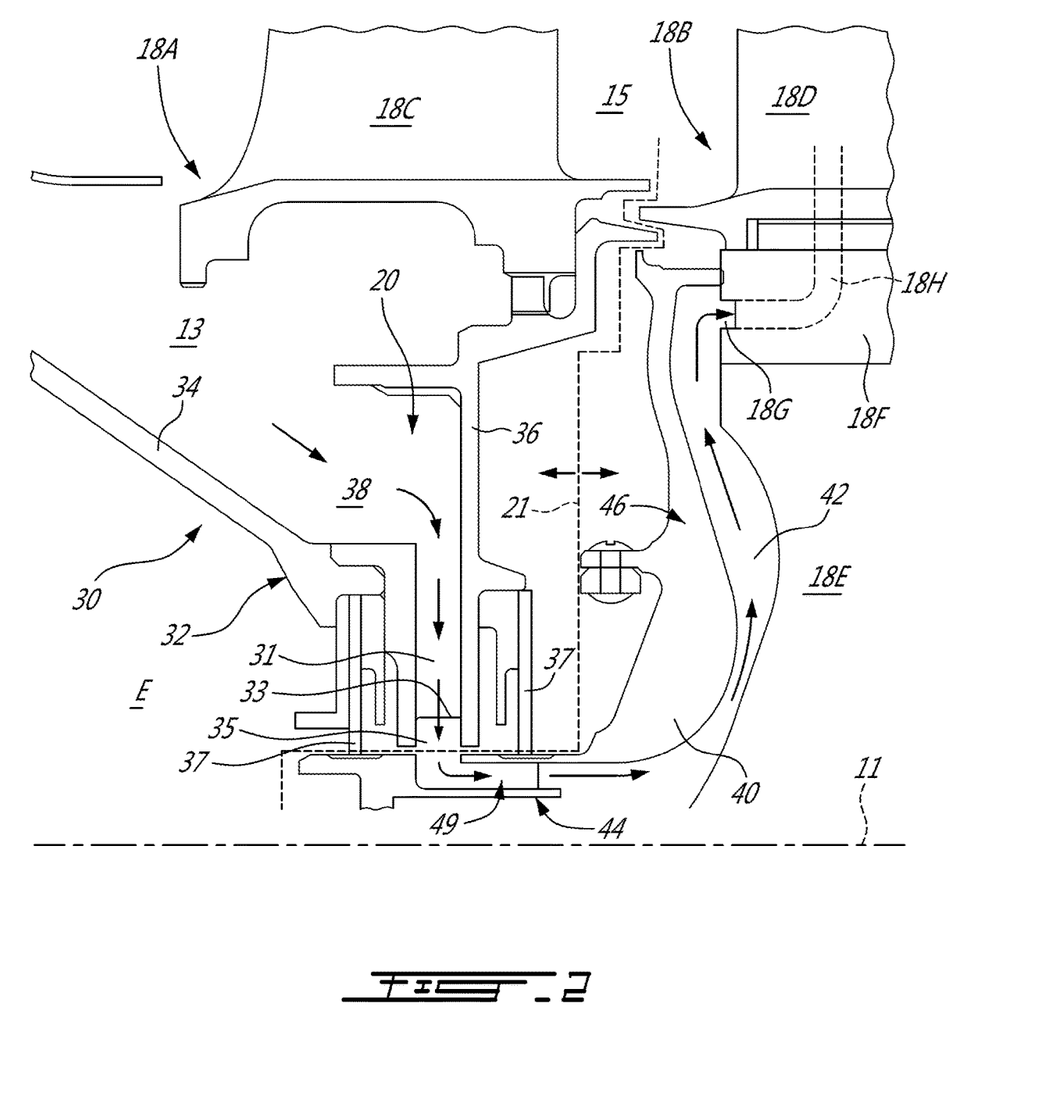
FIG. 2 is a schematic cross-sectional view of the enlarged portion II-II shown in FIG. 1, showing a tangential on-board injector (TOBI) assembly according to an embodiment of the present disclosure.

Referring to FIG. 2, an annular cavity 13 is formed within the stator assembly 18A and it functions in part as a reservoir for receiving cooling air from its source, for example, the discharge of the compressor section 14. The stator assembly 18A may be mounted to, or part of, a casing of the engine 10, and may therefore sometimes be referred to herein as a casing assembly. The cooling air is provided to the rotor assembly 18B to cool the rotor blades 18D, as described in greater detail below. In FIG. 2, immediately downstream of the row of stator vanes 18C is disposed the row of rotor blades 18D. The rotor blades 18D rotate about the center axis 11, and extend radially outwardly from a supporting rotor disk 18E via respective rotor blade roots 18F which are mounted in the supporting rotor disk 18E. The supporting rotor disk 18E includes a plurality of inlets 18G, each communicating with internal passages 18H of the rotor blade root 18F and the rotor blade 18D, through which the cooling air is flowable to cool the rotor blade 18D.

A cooling structure of the present disclosure is shown in FIG. 2 in the form of a Tangential On-Board Injection (TOBI) assembly 20. The TOBI assembly 20 helps to direct the cooling air in a direction of rotation of the rotor assembly 18B and further into the rotor assembly 18B to cool components thereof, such as the rotor blades 18D. The TOBI assembly 20 includes a TOBI 30 to increase the flow tangential velocity to reduce the losses and heat pickup due to windage, and a rotatable back plate, also referred to as a rotating component, disc plate, disc cover, rotating cover and rotating plate, 40 to distribute the cooling air to the rotor assembly 18B, both of which are now described.

In the embodiment shown in FIG. 2, the TOBI 30 is a stationary component. The TOBI 30 does not rotate with the rotor assembly 18B or with the back plate 40. In the depicted embodiment, the TOBI 30 is made stationary because a body 32 of the TOBI 30 is fixedly attached to the stator assembly 18A. FIG. 2 includes a demarcation line 21 which delineates the stationary or "static" components (e.g. the TOBI 30) of the TOBI assembly 20 from the rotating components (e.g. the back plate 40) of the TOBI assembly 20. In an alternate embodiment, the TOBI 30 is displaceable. In a particular embodiment, the expression "static" could be interpreted as a component rotating at a different speed, including counter-rotation.

The TOBI 30 has an annular upstream wall 34 and an annular downstream wall 36, it being understood that "upstream" and "downstream" are relative positions determined with respect to the direction of flow of the cooling air. The upstream and downstream walls 34,36 define an annular passageway 38 for receiving the cooling air. A plurality of circumferentially spaced-apart passages 31, which may be oriented in a tangential angle towards the direction of rotation of the rotor assembly 18B, extend radially inwardly toward the axis 11 and terminate at nozzles 33, which are provided to inject the cooling air from the annular passageway 38 into an annular transfer chamber 35 disposed radially inwardly from the nozzles 33. The transfer chamber 35 is a plenum in which the cooling air collects before it is transferred or provided to the back plate 40. In operation, cooling air enters the annular passageway 38 then is discharged by the nozzles 33 into the transfer chamber 35, and then to the rotating back plate 40. The nozzles 33 impart a swirl flow vector or swirling movement to the cooling air discharged into the transfer chamber 35, and also impart a radial flow vector being transverse or normal to the axis 11. The transfer chamber 35 is sealed with seals 37 which engage the rotating back plate 40 to prevent or reduce leakage of cooling air from the transfer chamber 35. The nozzles 33 directed the flow through a conduit 49 defined by the back plate 40.

In FIG. 2, the TOBI 30 is shown as a "radial" TOBI because the cooling air enters the TOBI 30 along a radial flow path. In an alternate embodiment, the TOBI 30 is an axial TOBI where the cooling air enters the TOBI 30 along an axial flow path. In some configurations of the gas turbine engine 10, a radial TOBI may be preferred because of its smaller axial length when compared to an axial TOBI.

Still referring to FIG. 2, the back plate 40 is mounted to the rotor assembly 18B to rotate with the rotor assembly 18B about the same axis 11. Rotation of the rotor assembly 18B causes rotation of the back plate 40. The back plate 40 is a cover plate or rotor cover that is positioned axially downstream or aft of the TOBI 30. The back plate 40 has an annular shape in the depicted embodiment. In a particular embodiment, the back plate is located upstream of the TOBI 30.

In the depicted embodiment, the back plate 40 is mounted upstream of the rotor disk 18E to rotate with it. The back plate 40 is mounted such that the radially outer periphery of the back plate 40 is forced by a centrifugal force to abut the rotor blade root 18F as the rotor assembly 18B rotates about the axis 11 so that an annular and radial passage 42 is formed between the rotor disk 18E and the back plate 40. Other embodiments for mounting the back plate 40 are possible and within the scope of the present disclosure.

Figure 3:
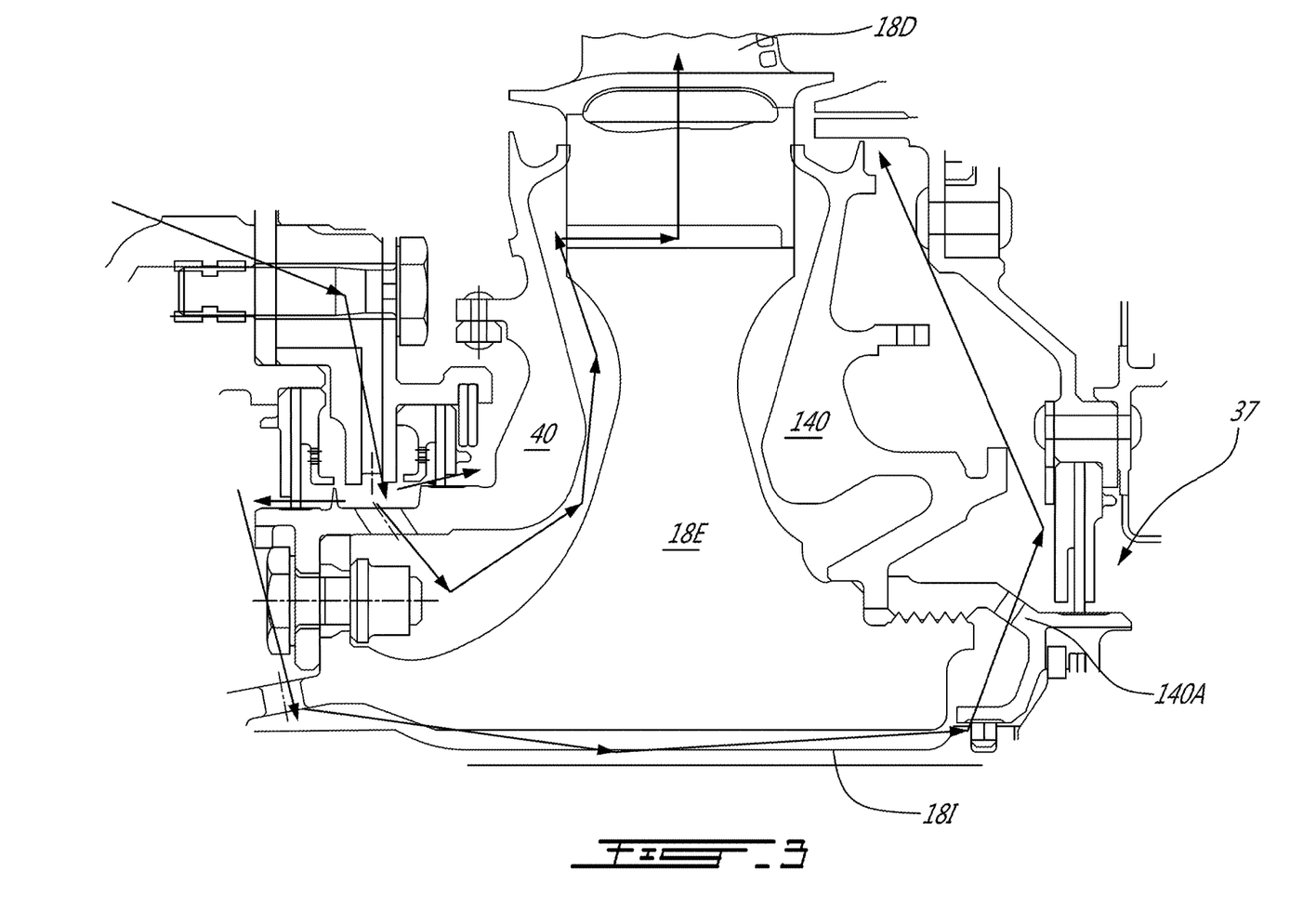
FIG. 3 is a schematic cross-sectional view of an enlarged portion of the gas turbine engine of FIG. 1, showing a tangential on-board injector (TOBI) assembly according to another embodiment of the present disclosure.

Referring to FIGS. 2 and 3, the cooling air flows into and through the back plate 40 to be supplied to the radial passage 42, and thence to the inlets 18G of the rotor disk 18E to cool the rotor blades 18D. The back plate 40 has an axial portion 44 and a radial portion 46. The axial portion 44 has an axial extent along a direction parallel to the axis 11, and the radial portion 46 has a radial axial extent along a direction transverse to the axis 11. The axial portion 44 is axially forward or upstream of the radial portion 46. The axial portion 44 is spaced radially inwardly (i.e. towards the axis 11) of the nozzles 33 of the TOBI 30, and receives the cooling air from the nozzles 33.

As shown in FIG. 3, a portion of the air leaks out of the transfer chamber 35 via one of the seals 37 and is circulated within an axial passage 181 defined through the rotor disk 18E to reach the opposite side of said disk 18E. Said air may then pass through an aperture 140A defined through another back plate 140 disposed on the opposite side of the disk 18E and circulate radially outwardly toward the blade 18D. Another seal 37 may be located on the opposite side of the rotor disk 18E to force air to circulate in a radially outward direction. Arrows in FIG. 4 illustrate how the air injected by the TOBI 30 circulates through the turbine section 18.

Figure 4:
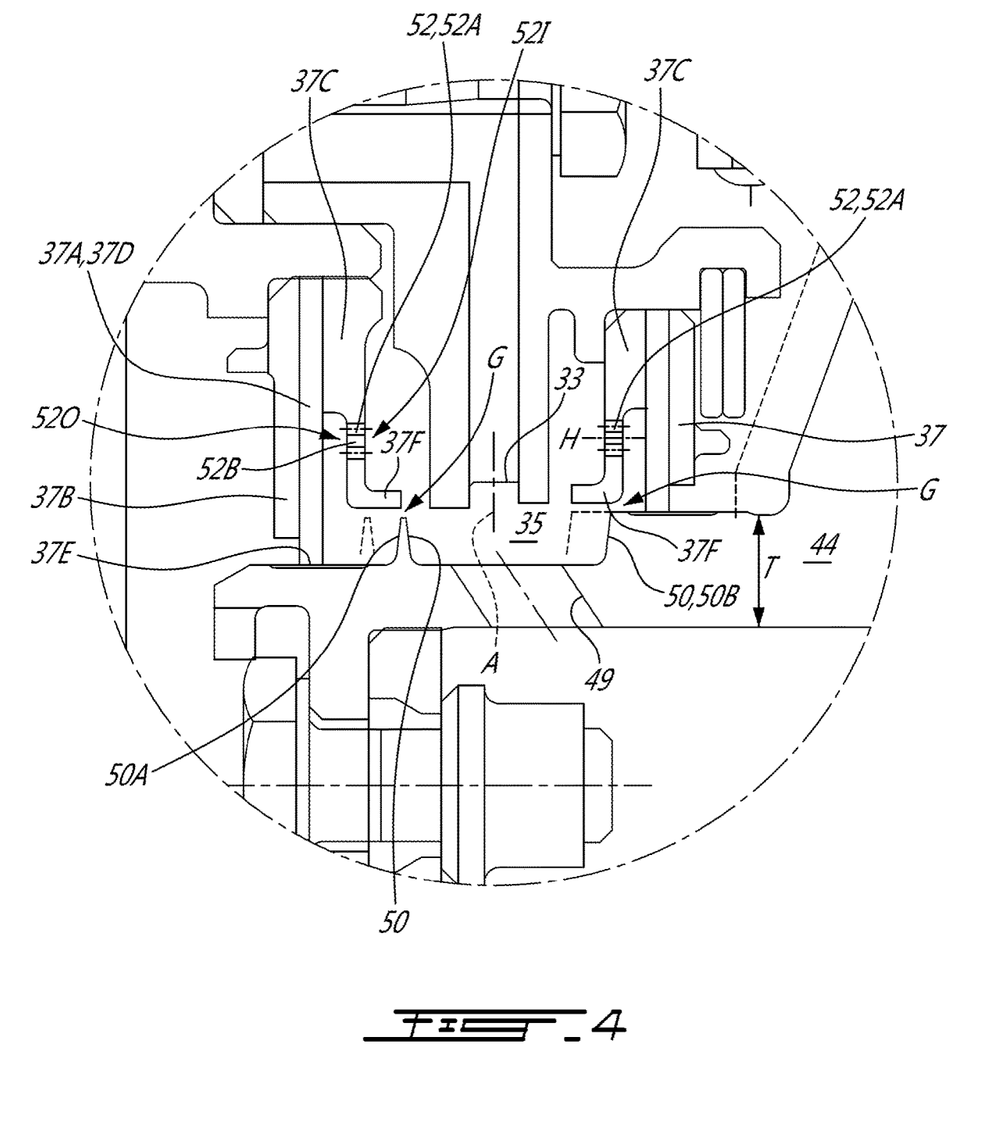
FIG. 4 is an enlarged view of a portion of FIG. 3.

Referring now to FIG. 4, in the embodiment shown, each of the seals 37 is a brush seal including an annular brush 37A that extends annularly around the central axis 11 (FIG. 1) of the engine 10 and two annular plates 37B, 37C, namely an outer annular plate 37B and an inner annular plate 37C, that both extend annularly around the central axis 11 and that are used for axially supporting bristles 37D of the annular brush 37A. Tips 37E of the bristles 37D may be in contact with the axial portion 44 of the back plate 40 and provide a sealing engagement with the axial portion 44 of the black plate 40. In the embodiment shown, the inner plates 37C of each of the seals 37 define axial protrusions 37F at their radially inner ends. The axial protrusions 37F protrude substantially axially toward the TOBI 30. In other words, the axial protrusions 37F of both of the seals 37 extend toward each other. The axial protrusions 37F may allow for axial movements between the TOBI 30 and the back plate 40.

In some cases, the swirl, tangential, or circumferential component imparted to the flow by the TOBI 30 may be detrimental to the seals 37. More specifically, the swirling flow exiting the TOBI 30 may damage the bristles 37D of the seals 37 and impair a sealing efficiency of the seals 37. In the embodiment shown, a plurality of features are used, either individually or in combination, to locally decrease the tangential component of the flow exiting the TOBI 30 so that the flow may be substantially axial when reaching the seals 37.

Still referring to FIG. 4, the back plate 40 of the TOBI includes flow deflectors 50. In the embodiment shown, the flow deflector 50 protrude radially outwardly from the axial portion 44 of the back plate 40 toward the axial protrusions 37F of the inner plates 37C of the seals 37. One of the flow deflectors 50 located on a left-hand side of the nozzle 33 of the TOBI 30 is provided in the form of a fin 50A whereas the other of the flow deflectors 50 located on a right-hand side of the nozzle 33 of the TOBI 30 is provided in the form of a substantially steep increase in a thickness T, taken in a radial direction relative to the central axis 11 of the engine 10, of the axial section 44 of the back plate 40. The steep increase in the thickness creates a substantially radial annular wall 50B facing the transfer chamber 35 downstream of the nozzle 33. The flow deflectors 50 may extend circumferentially all around the central axis 11. In other words, the flow deflectors 50 may be axisymmetric.

In an alternate embodiment, the flow deflectors 50 may be omitted and a radial length of the inner annular plates 37C may be increased such that a small radial gap is defined between a radially inner end of the elongated inner annular plates and the axial portion 44 of the back plate 40. Other configurations are contemplated.

In use, the temperature of the gas turbine engine 10 proximate the disk 18E of the turbine section 18 increases resulting in thermal expansion of some of the components. FIG. 4 shows in dashed line positions of the fins 50A and of the annular wall 50B under operation of the engine 10; the solid lines illustrating the position when the engine 10 is not in use. As shown in FIG. 4, each of the annular wall 50B and the fin 50A remains axially aligned relative to the central axis 11 of the engine 10 with a respective one of the axial protrusions 37F of the inner plates 37C of the seals. This may allow small gaps G to be maintained between the axial protrusions 37 F and a tip of the fin 50A and a radially outer end of the annular wall 50B regardless of the operating conditions of the engine 10. In other words, the axial protrusions 37F allow to maintain a dimension of the gaps G substantially constant in all operating conditions of the engine 10 and may avoid the tip of the fin 50A and the radially outer end of the annular wall 50B to become axially aligned with cavities located axially between the inner plates 37C of the seals 37 and the nozzle 33 of the TOBI 30 and/or with cavities located axially between the inner plates 37C of the seals 37 and the annular brushes 37A thereof.

The flow deflectors 50, that is, the fin 50A and the annular wall 50B in the embodiment shown, may allow to substantially shield the bristles 37D, more specifically their tips 37E, from the highly swirling flow exiting the nozzles 33 of the TOBI and may avoid wear over time caused by the tangential component of the flow exiting the nozzles 33. In other words, the flow deflectors 50 may protect the portion of the bristle tips 37E that are exposed to axial leakage flow.

Referring to FIGS. 3-4, the gaps G between the flow deflectors 50 and the inner plates 37C of the seals 37 may offer substantial flow resistance that may deter the flow from circulating therebetween. In other words, the gaps G are designed to be as small as possible to deter the air from entering the gaps G and to force the air to flow through flow passages 52. In the embodiment shown, the flow passages 52 are defined through the inner plates 37C of the seals 37. In the embodiment shown, the flow passages 52 are apertures 52A defined through the inner plates 37C. The apertures 52A are located radially outwardly of the axial protrusions 37F relative to the central axis 11.

Each of the flow passages 52 extends long a respective passage axis H. The passage axes H of the flow passage 52 may be parallel to the central axis 11 of the engine 10. Alternatively, the passage axis H may extend at an angle either with or opposite to the direction of rotation to control the exit swirl. In other words, the passage axis H may extend both axially and circumferentially relative to the central axis 11; a tangential component of the passage axis H may be either in the same direction as a direction of rotation of the rotor disk 18D or in an opposite direction as the direction of rotation of the rotor disk 18D. The flow passages 52 have passage inlets 52I and passage outlets 52O. A tangential component, relative to the central axis 11, of the passages axes H at the outlets 52O of the flow passages 52 may be different than a tangential component of the flow of cooling air exiting the discharge nozzles 33. In other words, each of the outlets of the discharge nozzles 33 defines an exit flow axis A. The exit flow axis A may have a tangential component that is different than the tangential component of the passage axes H. The tangential component of the passage axes H at the outlets 52O of the flow passages 52 may be zero. The tangential component of the passages axes H at the outlets 52O of the flow passages 52 may be less than that of the flow of cooling air exiting the plurality of discharge nozzles 33. The tangential component of the passage axes H at the outlets 52O of the flow passages 52 may be in the same direction as a direction of rotation of the back plate 40. The tangential component of the passage axes H at the outlets 52O of the flow passages 52 may alternatively be in an opposite direction as the direction of rotation of the back plate 40.

Herein, each of the passages axes H and the exit flow axes A extend along a respective unit vector. A unit vector has axial, radial, and tangential components. A norm of the axial, radial, and tangential components of the unit vector equals 1. Saying that the tangential component of a passage axis H is different than the tangential component of the exit flow axis A means that the value of the tangential component of a unit vector parallel to the passage axis H is different than the value of the tangential component of another unit vector parallel to the exit flow axis A.

When the flow passes through the flow passages 52, it may be deswirled to nearly zero. This may protect the seals 37, more specifically bristles 37D of the annular brushes 37A. The flow forced through the flow passages 52 may exit with swirl approaching the rotational velocity of the flow passages 52 and that of the annular brushes 37A.

Figure 5:
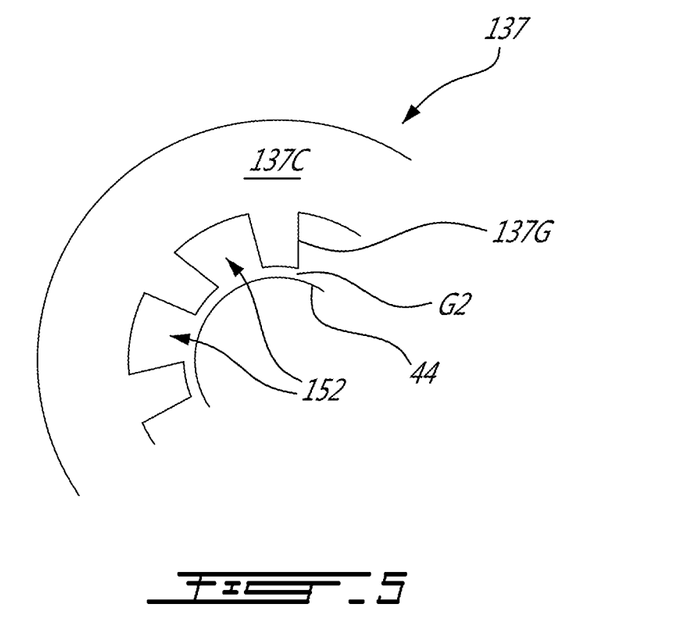
FIG. 5 is a schematic cross-sectional view of a portion of a brush seal in accordance with one embodiment.

Referring to FIG. 5, an alternate embodiment of the brush seal is generally shown at 137. For the sake of conciseness, only elements that differ from the brush seal 37 described above with reference to FIG. 4 are described herein below.

The brush seal 137 includes an inner annular plate 137C that defines a plurality of vanes 137G that are circumferentially distributed about the central axis 11 of the engine 10. The flow passages 152 are defined between each two circumferentially adjacent ones of the vanes 137G. The vanes 137G may have airfoil-shaped cross-sections. The flow passages 152 defined between the vanes 137G may have inlets oriented substantially parallel to a flow entering the flow passages 152 and have outlets oriented substantially parallel to the central axis 11. The flow passages 152 defined by the vanes may decrease a magnitude of a tangential component of the flow circulating therein from the inlets to the outlets. The tangential component of passage axes of the flow passages 152 may change from the inlets to the outlets of the flow passages 152. In the embodiment shown, the tangential component of passage axes of the flow passages 152 decreases from the inlets to the outlets of the flow passages 152. The tangential component of the passage axes may continuously change from the inlets to the outlets.

In the embodiment shown, the vanes 137G extend radially inwardly toward the axial portion 44 of the back plate 40 and may be radially spaced apart from the axial portion 44 by a gap G2 that may be of the same size of the gap G (FIG. 4) between the tip of the fin 50A and the axial protrusion 37F.

Figure 6:
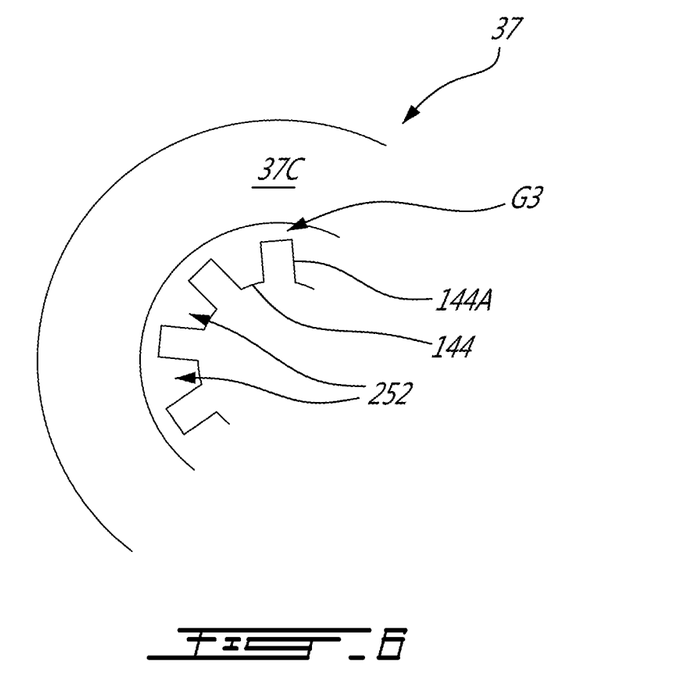
FIG. 6 is a schematic cross-sectional view of a portion of a rotating component of a portion of a TOBI assembly in accordance with another embodiment.

Referring to FIG. 6, an alternate embodiment of the axial portion of the back plate is generally shown at 144. For the sake of conciseness, only elements that differ from the axial portion 44 of the back plate 40 described above with reference to FIG. 4 are described herein below.

In the depicted embodiment, the axial portion 144 defines a plurality of blades 144A that are circumferentially distributed about the central axis 11 of the engine 10 and that protrude radially outwardly toward the axial protrusions 37F (FIG. 4) of the inner plates 37C of the seals 37. The flow passages 252 are defined between each two circumferentially adjacent ones of the blades 144A. The blades 144A may have airfoil-shaped cross-sections. The flow passages 252 defined between the blades 144A may have inlets oriented substantially parallel to a flow entering the flow passages 252 and have outlets oriented substantially parallel to the central axis 11. The flow passages 252 defined by the blades 144A may decrease a magnitude of a tangential component of the flow circulating therein from the inlets to the outlets.

In the embodiment shown, the blades 144A extend radially outwardly toward the axial protrusion 37F (FIG. 4) of the inner annular plate 37C of the brush seal 37 and may be radially spaced apart from the axial protrusion 37F by a gap G3 that may be of the same size of the gap G (FIG. 4) between the tip of the fin 50A and the axial protrusion 37F.

Referring to FIGS. 4-6, any surface that is wetted by a portion of the cooling air circulating from the nozzles 33 of the TOBI 30 and through the seals 37 may be provided with a surface finish to have a surface roughness. The surface roughness of the surface wetted by the cooling air may be greater than the surface roughness of other surfaces that are not wetted by the cooling air. Such a roughness may define flow deflecting surfaces, for instance defined by surfaces defining crests and valleys of the surface finish, which are able to decrease a magnitude of the tangential component of the flow circulating from the nozzles 33 through the seal 37. In other words, the crests and valleys of the rough surface finish may offer resistance to the flow in a tangential direction relative to the central axis 11. The crests and valleys may be aligned substantially parallel to the central axis 11.

The surface finish could also be used as an additional element to impact the swirl. A "rougher" or controlled surface finish on the side of the flow passages may enhance the effect of the flow passages by either increasing their effectiveness and/or improving the rate of decay of the incoming swirl.

The flow deflectors, flow passages and surface finish can be placed on components having different rotating speeds (e.g. rotating/static, rotating/rotating at different speed, and rotating/counter rotating, or vice-versa). Last, the brush seals (or any component to be protected) can be placed on either the rotating, static, or counter-rotating components.

The flow passages can be of variety of shape including a simple orifice (holes, slots, etc.), vanes, grooves, or notches, etc. The flow passages may be straight, that is having a passage axis being substantially parallel to the central axis 11 of the engine 10. The flow passages may be defined between grooves, vanes, notches, which may be defined by a radially inner end of the inner plates 37C of the seals. The flow passages may be any structure that is able to deflect or deswirl the flow that passes therethrough. Herein, "deflect" or "deswirl" means changing a magnitude of a tangential component of a velocity vector of the flow that circulate through the flow passages. The flow passages may be defined by deswirling element; the deswirling elements may be, for instance, the blades 144A (FIG. 6), the vanes 137G (FIG. 5), the apertures 52A (FIG. 4). The deswirling elements may be any structure that presents face oriented toward an incoming flow and oriented such as to be intersected by the incoming flow. One or more deswirling element(s) have a face oriented at least partially toward the plurality of discharge nozzles 33 and oriented to be intersected by the flow of the cooling air exiting the plurality of discharge nozzles 33. The face of the deswirling element(s) may be non-parallel to the flow exiting the discharge nozzles 33 such as to be impacted by the flow. In yet other words, the face of the deswirling element(s) may define a non-zero angle with the flow exiting the discharge nozzles 33 and may be oriented so as to at least partially face said flow. In the embodiment shown, the faces of the deswirling elements correspond to peripheral walls 52B of the apertures 52A.

For deswirling the cooling air from the tangential on-board injector (TOBI) 30, the flow of the cooling air is received from the nozzles 33 of the TOBI 30. A portion of the flow from the nozzles 33 is directed toward the seal. A magnitude of the tangential component of the portion of the flow is changed by circulating the portion of the flow through the flow passages 52 located between the seal and the nozzles 33.

In the embodiment shown, circulating the portion of the flow through the flow passages 52 includes circulating the portion of the flow through the apertures 52A defined through the annular plate 37C. Alternatively, circulating the portion of the flow through the flow passages 52 includes circulating the portion of the flow between the vanes 137G secured to the annular plate 137C and circumferentially distributed around the axis 11.

In the embodiment shown, changing the magnitude of the tangential component of the portion of the flow by circulating the portion of the flow through flow passages 52 includes continuously decreasing the magnitude of the tangential component of the portion of the flow from the inlets 52I of the flow passages 52 to the outlets 52O thereof. In some cases, the portion of the flow is deflected toward the flow passages 52. This may be carried by the flow deflector 50.

Embodiments disclosed herein include:

A. A tangential on-board injector (TOBI) of a gas turbine engine, comprising: a body defining an annular passageway configured to receive cooling air, the TOBI defining a plurality of discharge nozzles; a rotating component configured to be mounted for rotation relative to the body about an axis of rotation; a seal extending between the body and the rotating component; and flow passages circumferentially distributed about the axis of rotation and in fluid communication with the nozzles and the seal, the flow passages located upstream of the seal relative to a flow of the cooling air circulating toward the seal from the plurality of discharge nozzles, each of the flow passages extending along a respective passage axis, the passage axis of at least one of the flow passages having a tangential component at an outlet of the at least one of the flow passages that is different than a tangential component of an exit flow axis of at least one of the plurality of discharge nozzles.

B. A tangential on-board injector (TOBI) assembly of a gas turbine engine, comprising: a TOBI having a body defining an annular passageway configured to receive cooling air, the TOBI defining a plurality of discharge nozzles; a rotating component configured to be mounted for rotation relative to the body about an axis of rotation; a seal extending between the body and the rotating component; and at least one deswirling element upstream of the seal relative to a flow of the cooling air circulating toward the seal, the at least one deswirling element having a face oriented at least partially toward the plurality of discharge nozzles and oriented to be intersected by the flow of the cooling air exiting the plurality of discharge nozzles.

Embodiments A and B may include any of the following elements, in whole or in part, and in any combination:

Element 1: the seal is an annular brush of a brush seal, the brush seal further including an annular plate located upstream of the annular brush relative to the flow toward the seal, the flow passages being apertures extending through the annular plate along the passage axes. Element 2: the passage axis is parallel to the axis of rotation. Element 3: the tangential component of the passage axis at the outlet of the at least one of the flow passages is less than the tangential component of the exit flow axis. Element 4: the tangential component of the passage axis at the outlet of the at least one of the flow passages is zero. Element 5: the tangential component of the passage axis at the outlet of the at least one of the flow passages is in a same direction as a direction of rotation of the rotating component. Element 6: the tangential component of the passage axis at the outlet of the at least one of the flow passages is in an opposite direction as a direction of rotation of the rotating component. Element 7: the seal is an annular brush of a brush seal, the brush seal further including an annular plate located upstream of the annular brush relative to the flow circulating toward the seal, the flow passages defined between each two circumferentially adjacent ones of a plurality of vanes circumferentially distributed about the axis, the vanes secured to the annular plate. Element 8: the tangential component of the passage axis decreases from an inlet of the at least one of the flow passages to the outlet thereof. Element 9: further comprising a flow deflector circumferentially extending around the axis and secured to the rotating component upstream of the flow passages. Element 10: the flow deflector is a fin protruding from the rotating component. Element 11: the fin is axially aligned with a portion of the annular plate of the brush seal. Element 12: the seal is an annular brush of a brush seal, the brush seal further including an annular plate located upstream of the annular brush relative to the flow toward the seal, the at least one deswirling element including apertures extending through the annular plate. Element 13: passage axes of the apertures are parallel to the axis of rotation.

C. A method of deswirling cooling air from a tangential on-board injector (TOBI) of a gas turbine engine, comprising: receiving a flow of the cooling air from nozzles of the TOBI, a direction of the flow from the TOBI having a tangential component relative to a central axis of the gas turbine engine; directing a portion of the flow from the nozzles toward a seal located between a casing assembly and a rotor assembly; and changing a magnitude of a tangential component of the portion of the flow by circulating the portion of the flow through flow passages located between the seal and the nozzles.

Embodiment C may include any of the following elements in any combinations:

Element 14: the seal is an annular brush of a brush seal, the brush seal further including an annular plate located upstream of the annular brush, circulating the portion of the flow through the flow passage includes circulating the portion of the flow through apertures defined through an annular plate. Element 15: the seal is an annular brush of a brush seal, the brush seal further including an annular plate located upstream of the annular brush, circulating the portion of the flow through the flow passage includes circulating the portion of the flow between vanes secured to the annular plate and circumferentially distributed around the axis. Element 16: changing the magnitude of the tangential component of the portion of the flow by circulating the portion of the flow through flow passages includes continuously decreasing the magnitude of the tangential component of the portion of the flow from inlets of the flow passages to outlets thereof. Element 17: further comprising deflecting the portion of the flow toward the flow passage.

The above description is meant to be exemplary only, and one skilled in the art will recognize that changes may be made to the embodiments described without departing from the scope of the invention disclosed. For instance, the flow deflectors, flow passages, and surface finish may be used to protect other components than seals. In a particular embodiment, the flow passages, surface finish, and flow deflector may be used to increase the swirl (e.g. tangential component) of a flow. Still other modifications which fall within the scope of the present invention will be apparent to those skilled in the art, in light of a review of this disclosure, and such modifications are intended to fall within the appended claims.

The invention claimed is:

1. A tangential on-board injector (TOBI) of a gas turbine engine, comprising:
   a body defining an annular passageway configured to receive cooling air, the TOBI defining a plurality of discharge nozzles each having an outlet and defining an exit flow axis at the outlet;
   a rotating component configured to be mounted for rotation relative to the body about an axis of rotation;
   a seal extending between the body and the rotating component;
   a plurality of vanes circumferentially distributed about the axis of rotation and located downstream of the plurality of discharge nozzles relative to a flow of the cooling air circulating toward the seal from the plurality of discharge nozzles and upstream of the seal, the plurality of vanes being radially offset from the plurality of discharge nozzles relative to the exit flow axis; and
   flow passages defined between the plurality of vanes, a flow passage of the flow passages extending along a passage axis, the passage axis having a tangential component at an outlet of the flow passage that is less than a tangential component of the exit flow axis of each nozzle of the plurality of discharge nozzles.

2. The TOBI of claim 1, wherein the seal is an annular brush of a brush seal, the brush seal further including an annular plate located upstream of the annular brush relative to the flow of the cooling air circulating toward the seal, the plurality of vanes defined by the annular plate.

3. The TOBI of claim 2, wherein the plurality of vanes extend radially inwardly towards the rotating component relative to the axis of rotation.

4. The TOBI of claim 2, wherein the tangential component of the passage axis at the outlet of the flow passage is less than the tangential component of the exit flow axis.

5. The TOBI of claim 1, wherein the tangential component of the passage axis at the outlet of the flow passage is zero.

6. The TOBI of claim 1, wherein the tangential component of the passage axis at the outlet of the flow passage is in a same direction as a direction of rotation of the rotating component.

7. The TOBI of claim 1, wherein the tangential component of the passage axis at the outlet of the flow passage is in an opposite direction as a direction of rotation of the rotating component.

8. The TOBI of claim 1, wherein the tangential component of the passage axis decreases from an inlet of the flow passage to the outlet thereof.

9. The TOBI of claim 1, further comprising a flow deflector circumferentially extending around the axis of rotation and secured to the rotating component upstream of the flow passages.

10. The TOBI of claim 9, wherein the flow deflector is a fin protruding from the rotating component.

11. The TOBI of claim 10, wherein the seal is an annular brush of a brush seal, the fin axially aligned with a portion of an annular plate of the brush seal.

12. The TOBI of claim 1, wherein the plurality of vanes protrude from the rotating component.

13. A method of deswirling cooling air from a tangential on-board injector (TOBI) of a gas turbine engine, comprising:
   receiving a flow of the cooling air from nozzles of the TOBI along exit flow axes at outlets of the nozzles, a direction of the flow from the TOBI having a tangential component relative to a central axis of the gas turbine engine;
   directing a portion of the flow from the nozzles toward a seal located between a casing assembly and a rotor assembly; and
   changing and decreasing a magnitude of a tangential component of the portion of the flow by circulating the portion of the flow through flow passages defined between a plurality of vanes circumferentially distributed about the central axis and located downstream of the nozzles relative to the flow of the cooling air circulating toward the seal from the nozzles and upstream of the seal, the plurality of vanes being radially offset from the nozzles relative to the exit flow axes.

14. The method of claim 13, wherein the seal is an annular brush of a brush seal, the brush seal further including an annular plate located upstream of the annular brush, the circulating of the portion of the flow through the flow passages includes circulating the portion of the flow within the flow passages defined between the plurality of vanes defined by the annular plate.

15. The method of claim 13, wherein changing the magnitude of the tangential component of the portion of the flow by circulating the portion of the flow through flow passages includes continuously decreasing the magnitude of the tangential component of the portion of the flow from inlets of the flow passages to outlets thereof.

16. The method of claim 14, further comprising deflecting the portion of the flow toward the flow passages.

17. A tangential on-board injector (TOBI) assembly of a gas turbine engine, comprising:
   a TOBI having a body defining an annular passageway configured to receive cooling air, the TOBI defining a plurality of discharge nozzles each having an outlet and defining an exit flow axis at the outlet;
   a rotating component configured to be mounted for rotation relative to the body about an axis of rotation;
   a seal extending between the body and the rotating component;
   at least one deswirling element upstream of the seal relative to a flow of the cooling air circulating toward the seal, the at least one deswirling element having a face oriented at least partially toward the plurality of discharge nozzles and oriented to be intersected by the flow of the cooling air exiting the plurality of discharge nozzles, the at least one deswirling element including a plurality of vanes circumferentially distributed about the axis of rotation and located downstream of the plurality of discharge nozzles relative to a flow of the cooling air circulating toward the seal from the plurality of discharge nozzles and upstream of the seal, the plurality of vanes being radially offset from the plurality of discharge nozzles relative to the exit flow axis; and
   flow passages defined between the plurality of vanes, a flow passage of the flow passages extending along a passage axis, the passage axis having a tangential component at an outlet of the flow passage that is less than a tangential component of the exit flow axis of each nozzle of the plurality of discharge nozzles.

18. The TOBI of claim 17, wherein the seal is an annular brush of a brush seal, the brush seal further including an annular plate located upstream of the annular brush relative to the flow of the cooling air circulating toward the seal, the plurality of vanes defined by the annular plate.

19. The TOBI of claim 17, wherein a tangential component of a passage axis defined between two vanes of the plurality of vanes decreases from an inlet of a flow passage defined between the two vanes to an outlet thereof.

20. The TOBI of claim 17, wherein the plurality of vanes protrude from the rotating component.

* * * * *